United States Patent
Katsumata et al.

(10) Patent No.: US 9,377,360 B2
(45) Date of Patent: Jun. 28, 2016

(54) DEVICE AND METHOD FOR MEASURING TEMPERATURE OF HEAT-TREATED WORKPIECE

(71) Applicants: IHI Corporation, Tokyo (JP); IHI Machinery and Furnace Co., Ltd., Tokyo (JP)

(72) Inventors: Kazuhiko Katsumata, Tokyo (JP); Junji Inoue, Tokyo (JP); Takahisa Shimada, Tokyo (JP); Shinya Kudo, Tokyo (JP); Ami Ueda, Tokyo (JP)

(73) Assignees: IHI Corporation, Tokyo (JP); IHI Machinery and Furnace Co., Ltd., Tokyo (JP)

( * ) Notice: Subject to any disclaimer, the term of this patent is extended or adjusted under 35 U.S.C. 154(b) by 394 days.

(21) Appl. No.: 14/011,564

(22) Filed: Aug. 27, 2013

(65) Prior Publication Data

US 2014/0044148 A1 Feb. 13, 2014

Related U.S. Application Data

(63) Continuation of application No. PCT/JP2012/054793, filed on Feb. 27, 2012.

(30) Foreign Application Priority Data

Feb. 28, 2011 (JP) ................................. 2011-041792

(51) Int. Cl.
*G01J 5/02* (2006.01)
*G01J 5/00* (2006.01)
(Continued)

(52) U.S. Cl.
CPC . *G01J 5/02* (2013.01); *C21D 1/667* (2013.01); *C21D 11/005* (2013.01); *F27D 9/00* (2013.01);
(Continued)

(58) Field of Classification Search
CPC ....... G01J 5/0044; G01J 5/0875; G01J 5/046; G01J 5/02; C21D 1/667; C21D 11/005; F27D 9/00; F27D 19/00; F27D 21/0014; F27D 21/02
USPC ......................................... 374/130, 121, 120
See application file for complete search history.

(56) References Cited

U.S. PATENT DOCUMENTS 3,783,167 A * 1/1974 Tylko .................... C01B 13/145
373/23
4,270,898 A * 6/1981 Kelly ...................... F27D 19/00
432/19

(Continued)

FOREIGN PATENT DOCUMENTS

| JP | 61-193036 A | 8/1986 |
| JP | 63-288041 A | 11/1988 |

(Continued)

OTHER PUBLICATIONS

International Search Report issued in corresponding application No. PCT/JP2012/054793, completed Mar. 16, 2012 and mailed Mar. 27, 2012.

(Continued)

*Primary Examiner* — Lisa Caputo
*Assistant Examiner* — Philip Cotey
(74) *Attorney, Agent, or Firm* — Griffin and Szipl PC (57) ABSTRACT

A device is provided with a measurement window, which is provided in a heat treat furnace and which permits direct visual observation of a surface to be measured of a heat-treated workpiece, and a temperature sensor, which is provided outside the measurement window and which is capable of carrying out noncontact measurement of the surface temperature of the surface to be measured through the measurement window. The temperature sensor has a measurement wavelength range in which the absorptivity by water is low (e.g., 1.95 μm to 2.5 μm). Further, the measurement window is composed of a window material having a high transmittance in the measurement wavelength range (e.g., germanium).

9 Claims, 6 Drawing Sheets

(51) Int. Cl.
*G01J 5/08* (2006.01)
*C21D 1/667* (2006.01)
*F27D 9/00* (2006.01)
*F27D 21/02* (2006.01)
*C21D 11/00* (2006.01)
*F27D 19/00* (2006.01)
*F27D 21/00* (2006.01)
*G01J 5/04* (2006.01)

(52) U.S. Cl.
CPC ............ *F27D 19/00* (2013.01); *F27D 21/0014* (2013.01); *F27D 21/02* (2013.01); *G01J 5/0044* (2013.01); *G01J 5/046* (2013.01); *G01J 5/0875* (2013.01)

(56) References Cited

U.S. PATENT DOCUMENTS

| | | | | |
|---|---|---|---|---|
| 4,463,437 A * | 7/1984 | Schenck | ............... | G01J 5/0044 340/870.28 |
| 4,770,630 A * | 9/1988 | Akimoto | ............ | F27B 17/0016 432/121 |
| 5,452,882 A * | 9/1995 | Wunning | ............... | C21D 1/613 266/117 |
| 5,981,919 A * | 11/1999 | Masten, Jr. | ............... | C21D 1/34 148/511 |
| 5,992,159 A * | 11/1999 | Edwards | ............... | C21D 1/667 134/14 |
| 6,443,214 B1 * | 9/2002 | Matsuo | .................... | C21D 1/19 148/904 |
| 7,041,931 B2 * | 5/2006 | Jennings | .................. | F27B 5/16 118/50.1 |
| 7,968,044 B2 * | 6/2011 | Rocha | ....................... | C22B 1/22 134/131 |
| 2002/0104597 A1 * | 8/2002 | Frank | ...................... | B21B 37/74 148/541 |
| 2003/0108083 A1 * | 6/2003 | Seitz | ......................... | G01J 3/36 374/120 |
| 2005/0115945 A1 * | 6/2005 | Kesteren | ............. | F27B 17/0025 219/390 |
| 2005/0151306 A1 * | 7/2005 | Sokolowski | ............. | G01N 1/44 266/80 |
| 2009/0139468 A1 * | 6/2009 | Saviharju | ............... | G01J 5/0044 122/448.1 |
| 2009/0269713 A1 * | 10/2009 | Choi | ......................... | C21D 1/00 432/47 |
| 2010/0121479 A1 * | 5/2010 | Oi | ......................... | G01J 5/0003 700/212 |
| 2011/0262877 A1 | 10/2011 | Katsumata | | |
| 2012/0028202 A1 | 2/2012 | Katsumata | | |
| 2012/0242014 A1 | 9/2012 | Katsumata et al. | | |

FOREIGN PATENT DOCUMENTS

| | | |
|---|---|---|
| JP | 09-316544 A | 12/1997 |
| JP | 11-153386 A | 6/1999 |
| JP | 2001-281064 | 10/2001 |
| JP | 2007-171112 A | 7/2007 |
| JP | 2009-035792 A | 2/2009 |
| JP | 2010-002150 A | 1/2010 |
| JP | 2010-038531 A | 2/2010 |
| JP | 2010-249332 A | 11/2010 |

OTHER PUBLICATIONS

Office Action issued in corresponding German application 11 02012 001 031.0 on Nov. 12, 2015.

Office Action issued in corresponding Japanese application 2013-502334 on Nov. 11, 2015.

* cited by examiner

OUTSIDE TRANSMITTANCE OF Pyrex WITH 8mm THICKNESS

DEVICE AND METHOD FOR MEASURING TEMPERATURE OF HEAT-TREATED WORKPIECE

This is a Continuation Application in the United States of International Patent Application No. PCT/JP2012/054793 filed Feb. 27, 2012, which claims priority on Japanese Patent Application No. 2011-041792. The entire disclosures of the above patent application are hereby incorporated by reference.

TECHNICAL FIELD

The present invention relates to a device and a method for measuring the temperature of a heat-treated workpiece during mist cooling after a heating process.

BACKGROUND ART

There have been known water cooling, oil cooling, gas cooling, mist cooling and the like as the means for cooling a metal material, which is a heat-treated workpiece, after the heating process thereof.

Among the aforesaid cooling means, the mist cooling is adapted to supply a cooling liquid in a spraying manner through a plurality of nozzles surrounding a heat-treated workpiece so as to cool the treated workpiece by the mist that contains the cooling liquid. The mist means a gas that contains cooling liquid droplets.

A means for measuring the temperature of a heat-treated workpiece has been disclosed in, for example, Patent Literature 1. Further, mist cooling and a means for measuring the temperature of a heat-treated workpiece during mist cooling have been disclosed in, for example, Patent Literatures 2 and 3.

Patent Literature 1 discloses a method in which a temperature sensor (thermocouple) is provided in a dummy specimen having characteristics equivalent to those of a heat-treated workpiece and the temperature of the dummy specimen is measured, thereby managing the temperature of the heat-treated workpiece that is as accurate as the temperature of the heat-treated workpiece directly measured.

Patent Literatures 2 and 3 illustrate a thermocouple provided on a surface of a heat-treated workpiece and a noncontact type temperature measuring instrument, such as a radiation thermometer, as the means for measuring the temperature of a heat-treated workpiece in a mist cooling process.

CITATION LIST

Patent Literatures

PTL 1: Japanese Patent Publication Laid-open No. 2009-035792 "Heat Treatment Method and Heat Treatment Apparatus"
PTL 2: Japanese Patent Publication Laid-open No. 2010-38531 "Heat Treatment Device"
PTL 3: Japanese Patent Publication Laid-open No. 2010-249332 "Heat Treatment Device and Heat Treatment Method"

SUMMARY OF INVENTION

Technical Problem

Measuring the temperature of a heat-treated workpiece during a mist cooling process permits control of the rate of cooling of the heat-treated workpiece, thus making it possible to prevent quenching cracks of the heat-treated workpiece and to achieve less distortion of the heat-treated workpiece after the cooling.

However, the measurement of the temperature of a heat-treated workpiece in a heat treat furnace (e.g., a vacuum heat treat furnace) wherein mist exists has been susceptible to disturbances. Especially in the case where a thermocouple is installed on the surface of the heat-treated workpiece, the thermocouple comes in direct contact with the mist, thus being subjected to the influences of the flow and temperature of the mist. In addition, the thermocouple is inserted from outside the furnace, leading to the possibility of disturbances, such as external air, through an insertion opening.

An object of the present invention is to provide a device and a method for measuring the temperature of a heat-treated workpiece that permit the measurement of the surface temperature of the heat-treated workpiece subjected to mist cooling after heating in a heat treat furnace without being affected by the flow and temperature of mist, external air and the like.

Solution to Problem

According to the present invention, there is provided a device for measuring a temperature of a heat-treated workpiece placed in a heat treat furnace provided with a mist cooling device which performs cooling with mist containing droplets of a cooling liquid, including:
a measurement window which is provided in the heat treat furnace and which permits direct visual observation of a surface to be measured of the heat-treated workpiece; and
a temperature sensor which is provided outside the measurement window and which permits noncontact measurement of a surface temperature of the surface to be measured through the measurement window;
wherein the temperature sensor has a measurement wavelength range in which the absorptivity by water is below 100%, and
the measurement window is composed of a window material having a transmittance that is higher than 0% in the measurement wavelength range.

Further, according to the present invention, there is provided a method for measuring a temperature of a heat-treated workpiece placed in a heat treat furnace provided with a mist cooling device which performs cooling with mist that contains droplets of a cooling liquid, comprising steps of:
(A) selecting a temperature sensor which has, as a measurement wavelength range thereof, a wavelength range in which the absorptivity by water is below 100%, and which is capable of performing noncontact measurement of a surface temperature of a surface to be measured of the heat-treated workpiece, and a window material having a transmittance that is higher than 0% in the wavelength range; and
(B) measuring the surface temperature of the surface to be measured of the heat-treated workpiece by the temperature sensor through a measurement window composed of the window material.

According to the device and the method in accordance with the present invention, the temperature sensor has a measurement wavelength range in which the absorptivity by water is below 100% (e.g., 1.95 to 2.5 µm), and the measurement window is formed of a window material having a transmittance that is higher than 0% in the measurement wavelength range (e.g., germanium). This enables noncontact measurement of the surface temperature of the surface to be measured of the heat-treated workpiece through the measurement window by the temperature sensor (e.g., an infrared temperature sensor) provided outside the measurement window.

Further, even if the surface (the surface to be measured) of the heat-treated workpiece comes in direct contact with the mist, the infrared radiation from the surface of the heat-treated workpiece is not affected by the flow and temperature of the mist. Further, since the surface temperature of the surface to be measured of the heat-treated workpiece is measured through the window material from outside the measurement window, there is no opening for insertion from outside the furnace, thus eliminating the possibility of disturbances, such as external air, through the insertion opening.

Therefore, the possibility of being affected by the flow of the mist and the temperature of the mist is minimized during the cooling process, permitting the measurement of the surface temperature of the surface to be measured of the heat-treated workpiece from outside the surface.

Further, the cooling rate can be controlled, taking a composition change in the heat-treated workpiece into account, so that quenching cracks can be prevented and less distortion can be achieved, thus permitting significant improvement of the quality of the heat-treated workpiece.

More specifically, the treatment temperature during the mist cooling process is measured to grasp the period of time during which a high cooling rate is required, so that quick mist cooling can be carried out only during the period of time. Further, the cooling rate can be controlled to suit a temperature range by monitoring an Ms point indicating a temperature at which a phase change in steel starts and an Mf point at which the phase change finishes. This makes it possible to achieve the prevention of quenching cracks and less distortion of the heat-treated workpiece. It can be said that the technology for managing and controlling the temperature of a treated workpiece during the mist cooling process is considerably effective for quality improvement.

Advantageous Effects of Invention

According to the present invention, it is possible to provide a device and a method for measuring the temperature of a heat-treated workpiece that permit the measurement of the temperature of a surface of heat-treated workpiece, which is subjected to mist cooling after heating in a heat treat furnace, without being affected by the flow and temperature of the mist, an external air and the like.

DESCRIPTION OF EMBODIMENTS

The following will describe a preferable working example of the present invention with reference to the accompanying drawings. In the drawings, common components will be denoted by the same reference numerals and duplicate description thereof will be omitted.

Figure 1:
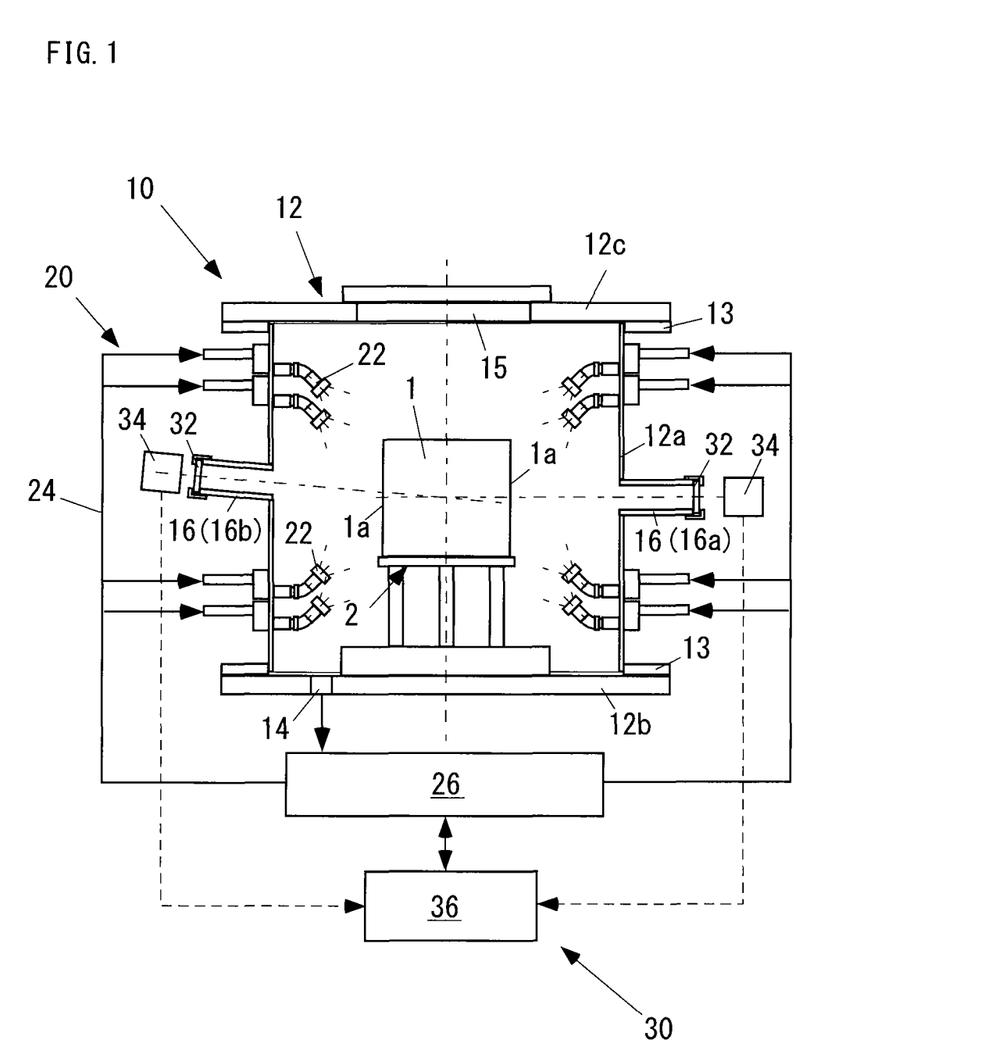
FIG. 1 It is a longitudinal sectional view illustrating an embodiment of a heat treat furnace provided with a temperature measurement device in accordance with the present invention.

FIG. 1 is a longitudinal sectional view illustrating an embodiment of a heat treat furnace 10 provided with a temperature measurement device 30 in accordance with the present invention.

In this example, the heat treat furnace 10 is a vacuum heat treat furnace adapted to carry out heat treatment on a heat-treated workpiece 1 (an object to be treated). The present invention is not limited to a vacuum heat treat furnace but may be another type of heat treat furnace, provided that it carries out heat treatment on the heat-treated workpiece 1.

The heat-treated workpiece 1 (the object to be treated) is, for example, die steel (SKD material) or high-speed steel (SKH material), or may be another type of metal material requiring heat treatment.

The heat-treated workpiece 1 is, for example, a columnar member having a diameter of 100 to 300 mm and a height of 100 to 300 mm; however, the present invention is not limited thereto, and the heat-treated workpiece 1 may have other shapes.

In FIG. 1, the heat treat furnace 10 has a furnace body 12.

The furnace body 12 is a hollow airtight vessel which includes a hollow cylindrical furnace trunk 12a having a vertical axial center, a furnace bottom member 12b covering the bottom surface of the furnace trunk 12a, and a furnace cover 12c covering the top surface of the furnace trunk 12a in this example.

The furnace trunk 12a in this example is a hollow cylindrical metal pipe with the top and the bottom ends thereof open, having flanges 13 for connection at the top and the bottom end thereof. The furnace trunk 12a may be provided with a jacket for cooling.

Further, a through pipe 16 for measurement windows 32 (to be described hereinafter) is airtightly installed to the furnace trunk 12a in this example.

The through pipe 16 in this example is formed of a horizontal through pipe 16a and a slanted through pipe 16b, which are disposed such that the axes thereof cross the surface (a surface to be measured 1a) of the heat-treated workpiece 1, allowing the surface to be measured 1a of the heat-treated workpiece 1 to be directly visually observed through the inside of the individual through pipes 16.

Further, in this example, the slanted through pipe 16b is provided aslant downward with respective to a horizontal plane. This arrangement enables the temperature sensor to aim at the central portion of a heat-treated workpiece, thus reducing fluctuations in temperature data among different sizes of heat-treated workpieces.

The furnace bottom member 12b is a circular flat plate, the outer rim of which is connected to the flange 13 at the bottom end of the furnace trunk 12a. The furnace bottom member 12b is provided with a discharge port 14, which allows fluids (a cooling liquid and a cooling gas) to be discharged to the outside from the furnace body 12.

The furnace cover 12c is a circular flat plate, the outer rim of which is connected to the flange 13 at the top end of the furnace trunk 12a. An opening 15 is provided at a central portion of the furnace cover 12c. The heat-treated workpiece 1 can be inserted into the heat treat furnace 10 from an upper vacuum treatment chamber (not shown) and taken out to the outside through the opening 15.

In FIG. 1, reference numeral 2 denotes a supporting member that supports the heat-treated workpiece 1.

The configuration of the supporting member 2 is not limited to the example, but may be different therefrom.

In FIG. 1, the heat treat furnace 10 is further provided with a mist cooling device 20.

The mist cooling device 20 has a plurality of nozzles 22, a fluid supply pipe 24, and a fluid supply device 26.

The plurality of nozzles 22, which are nozzles that inject fluids (a cooling liquid and a cooling gas), are provided inside the furnace body 12, surrounding the heat-treated workpiece 1. In this example, four nozzles 22 are installed, facing downward from above the heat-treated workpiece 1, and four other nozzles 22 are installed, facing upward from below the heat-treated workpiece 1. The quantity and the orientations of the nozzles 22 are arbitrary.

Alternatively, the nozzles 22 may be classified into ones for a liquid and ones for a gas, and these two types of nozzles may have different configurations.

The fluid supply pipe 24 is a conduit that connects the plurality of nozzles 22 and the fluid supply device 26 and supplies fluids (a cooling liquid and a cooling gas) to the plurality of nozzles 22 from the fluid supply device 26.

Alternatively, the fluid supply pipe 24 may be divided into one for a liquid and one for a gas, and different pipes may be used. Further, a pump, a compressor or a valve (a flow control valve, a pressure control valve or the like) may be provided in the middle of the fluid supply pipe 24.

The fluid supply device 26 recovers fluids (a cooling liquid and a cooling gas) discharged through the discharge port 14 of the furnace body 12 and circulates and supplies it to the fluid supply pipe 24.

The cooling liquid is water or a cooling liquid composed mostly of water. Further, the cooling gas is preferably an inert gas, such as argon, helium or nitrogen.

Further, the fluid supply device 26 is provided with a device for cooling and pressurizing the recovered fluids (a cooling liquid and a cooling gas), a pressure controller, and a flow controller.

Alternatively, the fluid supply device 26 may be divided into one for a liquid and one for a gas so as to independently supply a cooling liquid and a cooling gas, respectively.

A cooling liquid and a cooling gas are supplied simultaneously or alternately through the nozzles 22 by the aforesaid mist cooling device 20, and injected in a sprayed manner into the furnace body 12 through the nozzles 22. Mist containing the droplets of the cooling liquid is formed inside or outside the nozzles 22, making it possible to cool the heat-treated workpiece 1 by the mist (mist cooling).

The cooling liquid contained in the mist is composed of water or mostly of water, presenting higher cooling capability than conventional gas cooling due to the evaporative latent heat of the cooling liquid droplets.

Further, the ratio of the cooling liquid and the cooling gas constituting the mist can be arbitrarily adjusted, so that the cooling capability of the mist can be freely adjusted over an extensive range.

In FIG. 1, the heat treat furnace 10 is further provided with the temperature measurement device 30.

The temperature measurement device 30 is provided with the measurement windows 32, temperature sensors 34, and a temperature correction device 36.

The measurement windows 32 are airtightly installed to the outer ends of the through pipes 16 provided on the furnace trunk 12a. Further, the measurement windows 32 are formed of a window material having a high transmittance of light (infrared rays) in a measurement wavelength range of the temperature sensors 34. The transmittance is preferably higher than 0%.

The window material contains, for example, germanium, silicon, zinc selenium, sapphire, or quartz as its major ingredient.

The temperature sensors 34 are provided outside the measurement windows 32 to measure the surface temperature of the surface to be measured 1a of the heat-treated workpiece 1 through the measurement windows 32. The temperature sensors 34 have a measurement wavelength range in which the absorptivity of light (infrared rays) by water is low. The absorptivity is preferably below 100%.

The measurement wavelength range is preferably an infrared range of 1.95 µm to 2.5 µm. Further, the temperature sensors 34 are preferably infrared temperature sensors having measurement wavelength ranges of 1.95 µm to 2.5 µm.

The temperature correction device 36 corrects a temperature measurement value measured by the temperature sensors 34 on the basis of a correction factor of the emissivity of a heat-treated workpiece, a correction factor based on the transmittance of the window material, or a correction factor based on a mist concentration.

The configuration of the temperature measurement device 30 minimizes the susceptibility to the influences of the flow of the mist and the temperature of the mist during the cooling process, thus permitting highly accurate measurement of the surface temperature of the heat-treated workpiece 1 from outside the furnace. This makes it possible to significantly enhance the quality of a heat-treated workpiece.

Figure 2:
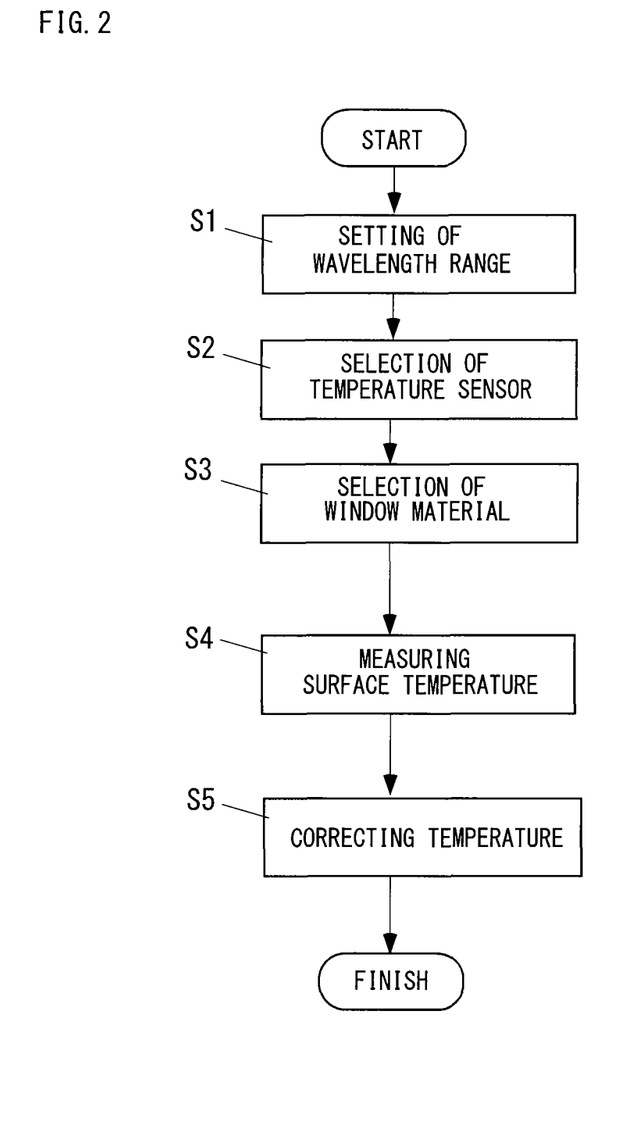
FIG. 2 It is a general flowchart of a method for measuring the temperature of a heat-treated workpiece according to a present example.

FIG. 2 is a general flowchart of a method for measuring the temperature of a heat-treated workpiece according to the present embodiment.

In the diagram, the temperature measurement method of the present embodiment consists of steps (processes) of S1 to S5.

In step S1 (setting of a wavelength range), a wavelength range in which the absorptivity by water is low is set. The wavelength range is 1.95 to 2.5 µm in the embodiment discussed hereinafter.

In step S2 (selection of a temperature sensor), the temperature sensors 34 capable of noncontact measurement of the surface to be measured of the heat-treated workpiece 1 by using the set wavelength range as the measurement wavelength range are selected.

The temperature sensors 34 are infrared temperature sensors in the embodiment discussed hereinafter.

In step S3 (selection of a window material), a window material having a high transmittance in the set wavelength range (the measurement wavelength range) is selected.

The window material is germanium in the embodiment discussed hereinafter.

In step S4, the surface temperature of the surface to be measured 1a of the heat-treated workpiece 1 is measured by the temperature sensors 34 through the measurement windows 32 composed of the selected window material.

In step S5, the measured temperature value obtained by the temperature sensors is corrected on the basis of the correction factor of the emissivity of the heat-treated workpiece, the correction factor based on the transmittance of the window material, or the correction factor based on the mist concentration.

The temperature measurement method described above minimizes the susceptibility to the influences of the flow of the mist and the temperature of the mist during the cooling process, thus permitting highly accurate measurement of the surface temperature of the heat-treated workpiece 1 from outside the furnace. Further, the cooling rate can be controlled, taking a composition change in the heat-treated workpiece into account, so that quenching cracks can be prevented and less distortion can be achieved, thus permitting significantly enhanced quality of the heat-treated workpiece 1.

(Range of Low Water Absorptivity and Window Material)

Figure 3:
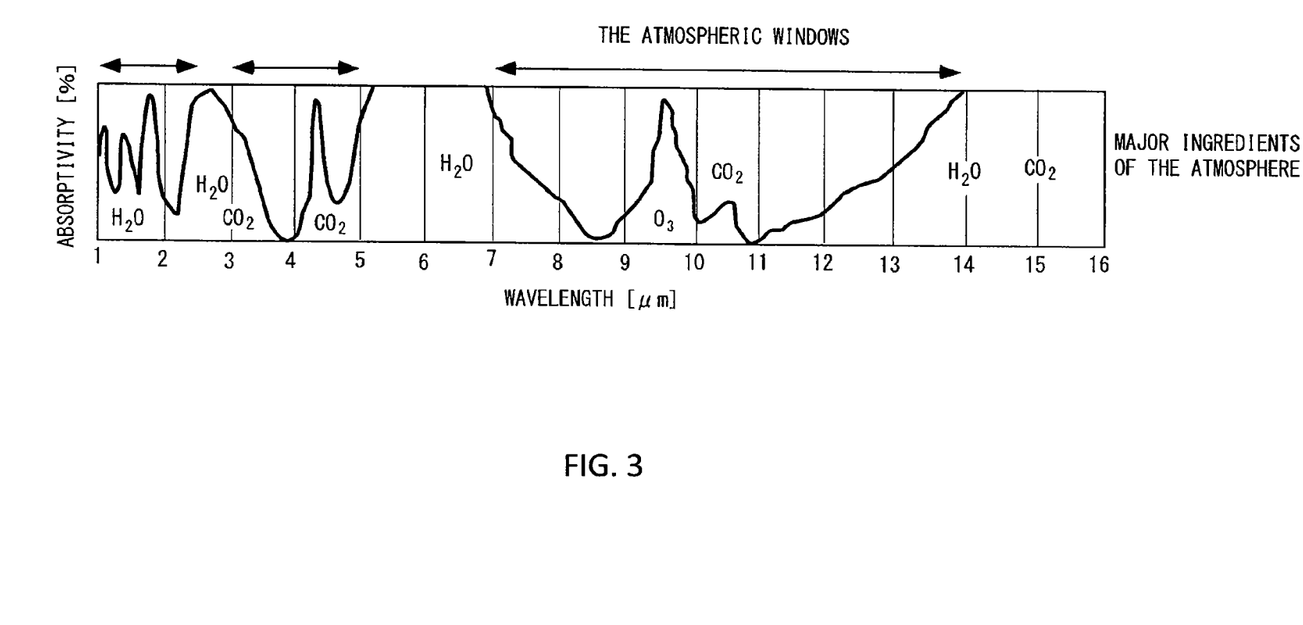
FIG. 3 It is a diagram illustrating the absorptivity of the atmosphere at each wavelength.

FIG. 3 is a diagram illustrating the absorptivity by the atmosphere at each wavelength. According to the diagram, the absorptivity by the atmosphere is low in the ranges of wavelengths of 1 to 2.5 μm, 3 to 5 μm, and 7 to 14 μm, which are indicated by the double-headed arrows, the ranges being referred to as "the atmospheric windows." In the wavelength ranges exhibiting high absorptivity, major absorbing ingredients of the atmosphere are shown. From FIG. 3, it is seen that the absorptivity by water is low in the wavelength ranges of the atmospheric windows.

Figure 4:
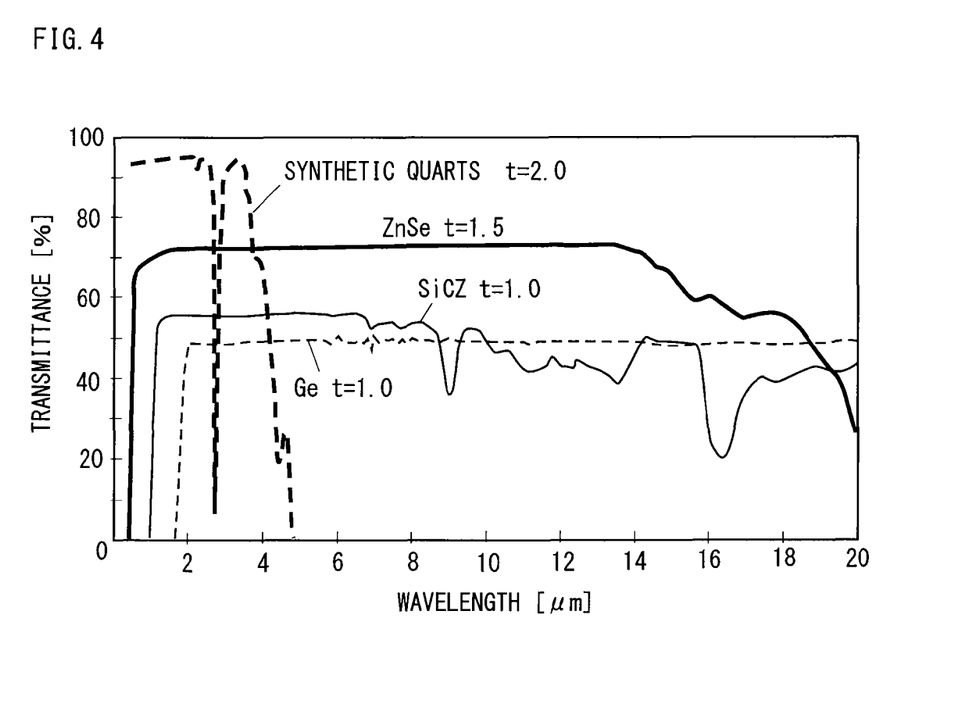
FIG. 4 It is a diagram illustrating the transmittance of a typical window material.

FIG. 4 is a diagram illustrating the transmittance of a typical window material. As illustrated in the diagram, quartz exhibits a high transmittance at wavelengths of 1 to 2.5 μm and 3 to 4 μm, exhibits a considerably reduced transmittance at wavelengths of 2.5 to 3 μm and 4 to 4.5 μm, and hardly exhibits transmittance at wavelengths that are greater than the wavelength of 4.5 μm.

In contrast thereto, it is seen that Ge (germanium), Si (silicon), and ZnSe (zinc selenium) maintain high transmittances from short wavelengths to long wavelengths of 1.8 to 20 μm.

The present embodiment combines the selection of the temperature sensors 34, which use the wavelength range of a low absorptivity by water, as the measurement wavelength range, and the window material having a high transmittance in the wavelength range (the measurement wavelength range), thereby enabling the measurement of the temperature of a workpiece during the mist cooling process.

Heat-resistant glass (registered trademark: Pyrex) and Ge (germanium) have been selected as the window material, and infrared temperature sensors having measurement wavelength ranges of 8 to 13 μm and 1.95 to 2.5 μm have been selected as the temperature sensors.

Further, a stainless steel (SUS304) piece having a diameter of 80 mm and a height of 80 mm has been used as a test piece of the heat-treated workpiece 1. A thermocouple was embedded at a position that is 5 mm away from the surface of the test piece to measure the temperature at the position. At the same time, two selected types of temperature sensors measured the surface temperature. Hereinafter, an infrared temperature sensor having a measurement wavelength range of 8 to 13 μm will be referred to as "the long wavelength temperature sensor" and an infrared temperature sensor having a measurement wavelength range of 1.95 to 2.5 μm will be referred to as "the short wavelength temperature sensor."

The test piece was heated to approximately 850° C. and then cooled by mist to room temperature. The temperatures during the mist cooling were measured by the thermocouple (T/C) and the temperature sensors (the long wavelength temperature sensor and the short wavelength temperature sensor), and the measurement data was compared. The results are shown in Table 1.

TABLE 1

| Window Material | Measurement Wavelength of Temperature Sensor | |
|---|---|---|
| | 8~13 μm | 1.95~2.5 μm |
| Pyrex | Temperature Unmeasurable | Temperature Unmeasurable |
| Ge | Temperature Unmeasurable | Temperature Measurable |

As shown in Table 1, at the long wavelengths (the measurement wavelength range of 8 to 13 μm), the temperatures could be measured through neither of the two types of window materials, namely, the heat-resistant glass and germanium (Temperatures Unmeasurable). At the short wavelengths (the measurement wavelength range of 1.95 to 2.5 μm), the temperatures could not be measured through the heat-resistant glass, whereas the temperatures could be measured through Ge (Temperature Measurable).

The following will describe the reasons.

Figure 5:
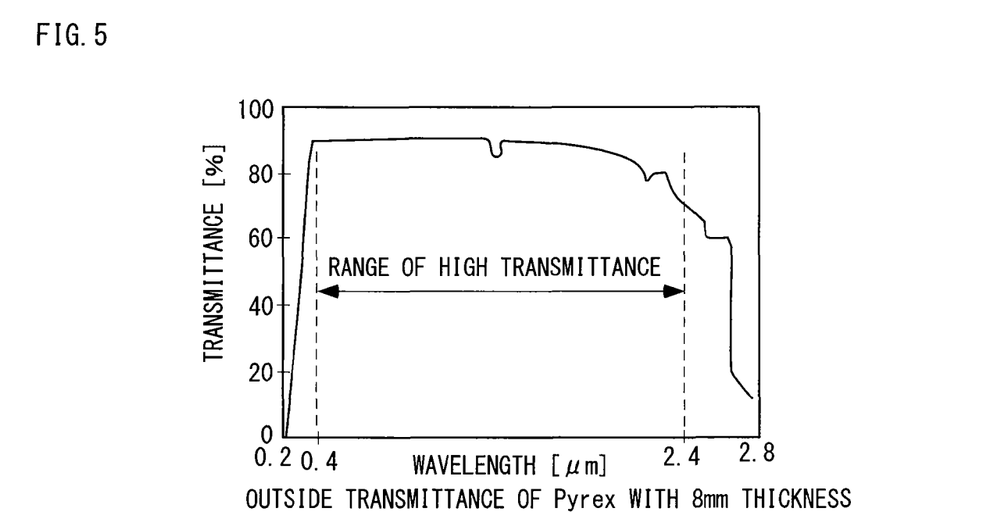
FIG. 5 It is a diagram illustrating the relationship between the wavelength and the transmittance of heat-resistant glass.

(1) In the case of the heat-resistant glass window×the long wavelength temperature sensor FIG. 5 is a diagram illustrating the relationship between wavelength and transmittance of the heat-resistant glass.

The heat-resistant glass (registered trademark: Pyrex) contains borosilicate glass as the chief ingredient thereof, and is highly transmissive in a wavelength range of 0.4 to 2.4 μm. Hence, it is considered that the infrared rays of the measurement wavelength (measurement wavelength of the long wavelength temperature sensor: 8 to 13 μm) emitted from the test piece were absorbed by the heat-resistant glass window, thus preventing the temperatures from being properly measured.

(2) In the case of the Ge window×the long wavelength temperature sensor

Figure 6:
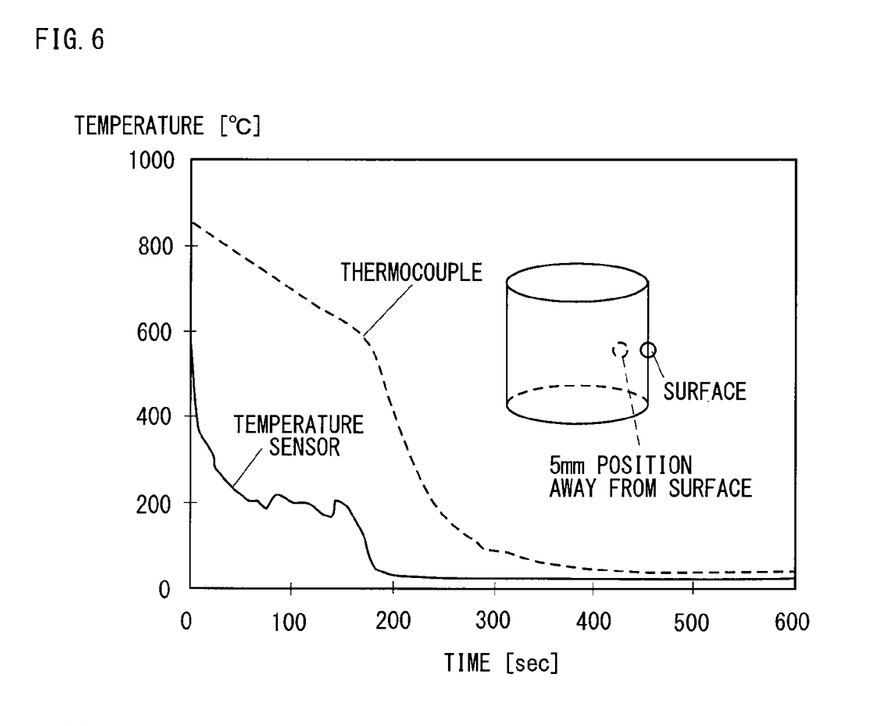
FIG. 6 It is a diagram illustrating the temperature measurement results obtained by a combination of a Ge window and a long-wavelength temperature sensor.

FIG. 6 is a diagram illustrating the temperature measurement results obtained by the combination of the Ge window and the long wavelength temperature sensor. In the diagram, the dashed line denotes the temperatures measured by the thermocouple, while the solid line denotes the temperatures measured by the long wavelength temperature sensor.

The test results indicate that the two lines have different slopes, so that it was determined that no accurate temperature measurement could be accomplished.

Figure 7:
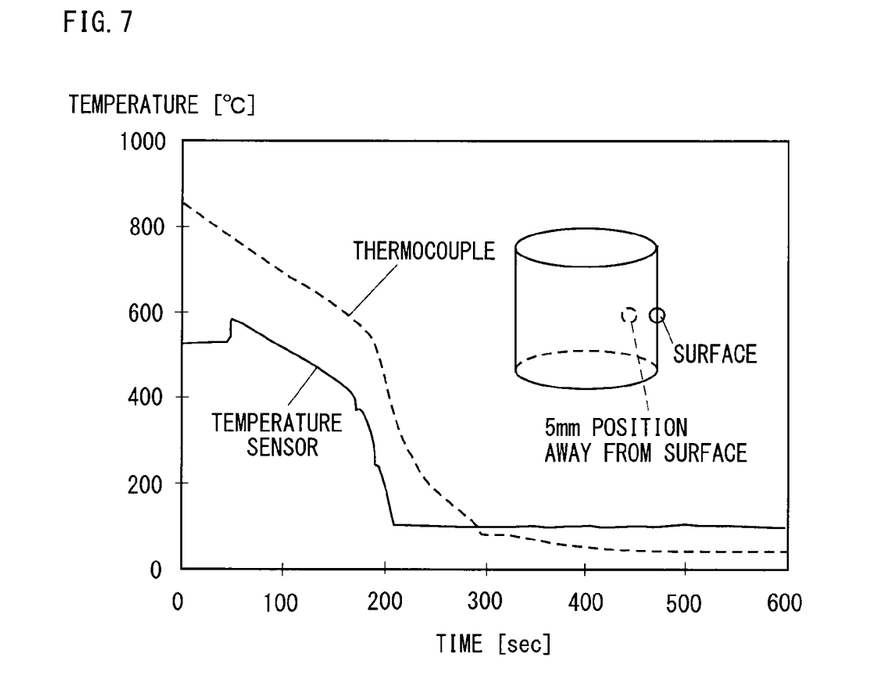
FIG. 7 It is a diagram illustrating the temperature measurement results obtained by a combination of a heat-resistant glass window and a short-wavelength temperature sensor.

(3) In the case of the heat-resistant glass window×the short wavelength temperature sensor FIG. 7 is a diagram illustrating the temperature measurement results obtained by the combination of the heat-resistant glass window and the short wavelength temperature sensor. In the diagram, the dashed line denotes the temperatures measured by the thermocouple, while the solid line denotes the temperatures measured by the short wavelength temperature sensor.

The test results disclose that, although the two lines share a temperature range showing substantially the same gradient (slope), the emissivity of the short-wavelength infrared rays is extremely small (0.05) in the test piece, indicating that the data is not highly reliable. Thus, it was determined that the temperatures could not be measured by this combination.

(4) In the case of the Ge window×the short wavelength temperature sensor

Figure 8:
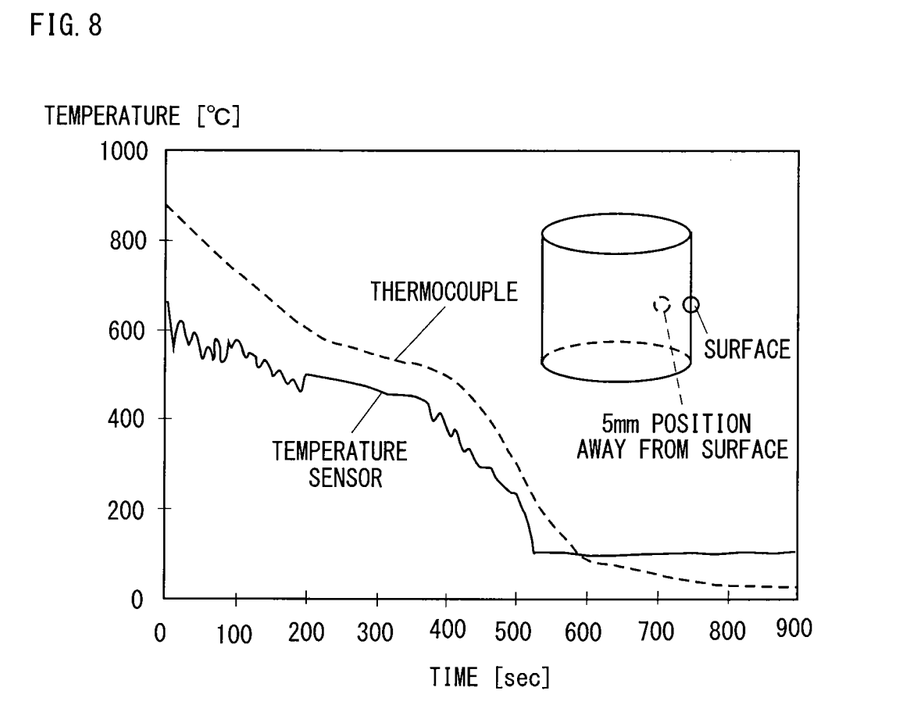
FIG. 8 It is a diagram illustrating the temperature measurement results obtained by a combination of the Ge window and the short-wavelength temperature sensor.

FIG. 8 is a diagram illustrating the temperature measurement results obtained by the combination of the Ge window and the short wavelength temperature sensor. In the diagram, the dashed line denotes the temperatures measured by the thermocouple, while the solid line denotes the temperatures measured by the short wavelength temperature sensor.

In this example, to cool the test piece, spraying the mist and stopping the mist spray were repeated for every 10 seconds in a high temperature range (0 to 200 sec) and a low temperature range (380 to 500 sec). The cooling (mist cooling) was carried out in a pattern wherein the mist spray was interrupted for 180 seconds, the temperature being measured by the short wavelength temperature sensor in the vicinity of 450° C. for 200 to 380 sec.

The test results indicate that the slopes of the measurement data provided by the thermocouple and the short wavelength temperature sensor substantially coincide, so that it can be said that the measurement of the surface temperature of the workpiece during the mist cooling process is possible by correcting the measurement data provided by the short wavelength temperature sensor.

Further, in FIG. 8, the temperatures measured by the short-wavelength temperature sensor during the mist cooling vary up and down, as compared with the case where no mist is sprayed. However, the mean value of the temperatures measured during the mist cooling is substantially the same as that in the case where no mist is sprayed.

Therefore, it is likely that the mist concentration exerts less influence on the measurement temperatures.

(Correction of the Measurement Data of the Temperature Sensors)

(1) Correction of the Emissivity of the Temperature Sensors

The infrared temperature sensor is considerably influenced by the condition of the surface of an object, the temperature of which is to be measured. For example, in the case of a metal surface, it is necessary to correct the emissivity of stainless steel having high luminance to 0.45, or to correct the emissivity of steel with an oxide film bonded thereto to 0.69.

Then, as a prior test, the value of the temperature measured by bringing the thermocouple into contact with the surface of the test piece and the value of the temperature measured by the aforesaid temperature sensor (the short wavelength temperature sensor) at the same position are compared, and the correction factor of the emissivity is determined such that both values become the same.

(2) Correction Based on the Transmittance of the Window Material

The transmittance at each wavelength varies, depending on the type of the window material. As a prior test, the value of the temperature measured by bringing the thermocouple into contact with the surface of the test piece and the value of the temperature at the same position measured by the aforesaid temperature sensor (the short wavelength temperature sensor) through the window material are compared, and the correction factor based on the emissivity of the window material is determined such that both values become the same.

(3) Correction Based on the Concentration of Mist

The amount of infrared rays to be absorbed varies according to a mist concentration. The value of the temperature measured by a thermocouple embedded in the vicinity of the surface of a workpiece and the value of the temperature measured by the temperature sensor from outside the furnace are compared to identify the relationship between the mist concentration and the temperature measurement values obtained by the temperature sensor, thus leading to a correction factor based on the mist concentration that enables the correction of the influence of changes in the mist concentration exerted on the temperature measurement values.

The correction methods described above are reduced to a correction formula, namely, expression (1) given below.

Surface temperature correction value=(Correction factor of emissivity)×(Correction factor based on the transmittance of the window material)×(Correction factor based on the mist concentration)× Measured temperature value of the temperature sensor    (1)

According to the device and the method of the present embodiment described above, the temperature sensors 34 have the measurement wavelength range in which the absorptivity by water is below 100% (e.g., 1.95 to 2.5 μm), and the measurement windows 32 are composed of a window material having a transmittance that is higher than 0% in the aforesaid measurement wavelength range (e.g., germanium). This enables the noncontact measurement of the surface temperature of the surface to be measured 1a of the heat-treated workpiece 1 through the measurement windows 32 by the temperature sensors 34 (the infrared temperature sensors) provided outside the measurement windows 32.

Further, even if the surface (the surface to be measured 1a) of the heat-treated workpiece 1 comes in direct contact with mist, the infrared radiation from the surface of the heat-treated workpiece 1 will not be affected by the flow and temperature of the mist. Further, since the surface temperature of the surface to be measured 1a of the heat-treated workpiece 1 is measured through the window material from outside the measurement windows 32, there is no opening for insertion from outside the furnace, thus eliminating the possibility of disturbances, such as external air, through the insertion opening.

Thus, the susceptibility to the flow of mist and the temperature of mist during a cooling process is minimized, so that the surface temperature of the surface to be measured 1a of the heat-treated workpiece 1 can be measured from outside the furnace with extremely high accuracy. This permits a significantly enhanced quality of the heat-treated workpiece 1.

Further, the cooling rate can be controlled, taking a composition change in the heat-treated workpiece 1 into account, so that quenching cracks can be prevented and less distortion can be achieved, thus permitting a considerably enhanced quality of the heat-treated workpiece 1.

More specifically, the treatment temperature during the mist cooling process is measured to grasp the period of time during which a high cooling rate is required, so that quick mist cooling can be carried out only during the period of time. Further, the cooling rate can be controlled to suit a temperature range by monitoring the Ms point at which a phase change in steel starts and an Mf point at which the phase change finishes. This makes it possible to achieve the prevention of quenching cracks and less distortion of the heat-treated workpiece 1. It can be said that the technology for managing and controlling the temperature of a treated workpiece during the mist cooling process is considerably effective for improving quality.

The present invention is not limited to the embodiments described above, and it is obvious that many modifications can be added without departing from the spirit and the scope of the present invention.

REFERENCE SIGNS LIST

1 heat-treated workpiece (object to be treated), 1a surface to be measured,
10 heat treat furnace, 12 furnace body,
20 mist cooling device,
30 temperature measurement device, 32 measurement window
34 temperature sensor (infrared temperature sensor)
36 temperature correction device

The invention claimed is:

1. A device for measuring a temperature of a heat-treated workpiece placed in a heat treat furnace provided with a mist cooling device that performs cooling with mist containing droplets of a cooling liquid, comprising:
- a measurement window that is provided in the heat treat furnace and that permits direct visual observation of a surface to be measured of the heat-treated workpiece;
- a temperature sensor that is provided outside the measurement window and that permits noncontact measurement of a surface temperature of the surface to be measured through the measurement window; and
- a temperature correction device which corrects a temperature measurement value measured by the temperature sensor on the basis of a correction factor of an emissivity of a heat-treated workpiece, a correction factor based on a transmittance of the window material, or a correction factor based on a mist concentration;
- wherein the temperature sensor has a measurement wavelength range in that an absorptivity by water is below 100%, and
- the measurement window is composed of a window material having a transmittance that is higher than 0% in the measurement wavelength range.

2. The device for measuring a temperature according to claim 1, wherein the temperature sensor is an infrared temperature sensor that has a measurement wavelength range of 1.95 µm to 2.5 µm.

3. The device for measuring a temperature according to claim 2, wherein the window material of the measurement window contains germanium, silicon, zinc selenium, sapphire, or quartz as an ingredient thereof.

4. The device for measuring a temperature according to claim 3, wherein the measurement window is provided in the heat treat furnace such that the measurement window is tilted downward with respect to a horizontal plane.

5. The device for measuring a temperature according to claim 2, wherein the measurement window is provided in the heat treat furnace such that the measurement window is tilted downward with respect to a horizontal plane.

6. The device for measuring a temperature according to claim 1, wherein the window material of the measurement window contains germanium, silicon, zinc selenium, sapphire, or quartz as an ingredient thereof.

7. The device for measuring a temperature according to claim 6, wherein the measurement window is provided in the heat treat furnace such that the measurement window is tilted downward with respect to a horizontal plane.

8. The device for measuring a temperature according to claim 1, wherein the measurement window is provided in the heat treat furnace such that the measurement window is tilted downward with respect to a horizontal plane.

9. A method for measuring a temperature of a heat-treated workpiece placed in a heat treat furnace provided with a mist cooling device that performs cooling with mist that contains droplets of a cooling liquid, comprising steps of:
- (A) selecting a temperature sensor that has, as a measurement wavelength range thereof, a wavelength range in that an absorptivity by water is below 100%, and that is capable of performing noncontact measurement of a surface temperature of a surface to be measured of the heat-treated workpiece, and a window material having a transmittance that is higher than 0% in the wavelength range; and
- (B) measuring the surface temperature of the surface to be measured of the heat-treated workpiece by the temperature sensor through a measurement window composed of the window material,
- wherein a temperature measurement value measured by the temperature sensor is corrected on the basis of a correction factor of an emissivity of a heat-treated workpiece, a correction factor based on a transmittance of the window material, or a correction factor based on a mist concentration.

\* \* \* \* \*